Nov. 8, 1960     I. D. WALLACH     2,959,071
TRANSMISSION
Filed Dec. 10, 1958     4 Sheets-Sheet 1

INVENTOR.
IRVING D. WALLACH
BY
Kane, Dalsimer and Kane
ATTORNEYS.

Nov. 8, 1960     I. D. WALLACH     2,959,071
TRANSMISSION

Filed Dec. 10, 1958     4 Sheets-Sheet 2

INVENTOR.
IRVING D. WALLACH

BY
Kane, Dalsimer and Kane
ATTORNEYS

Nov. 8, 1960     I. D. WALLACH     2,959,071

TRANSMISSION

Filed Dec. 10, 1958     4 Sheets-Sheet 3

INVENTOR.
IRVING D. WALLACH

BY
Kane, Dalsimer and Kane

ATTORNEYS.

Nov. 8, 1960     I. D. WALLACH     2,959,071
TRANSMISSION
Filed Dec. 10, 1958     4 Sheets-Sheet 4
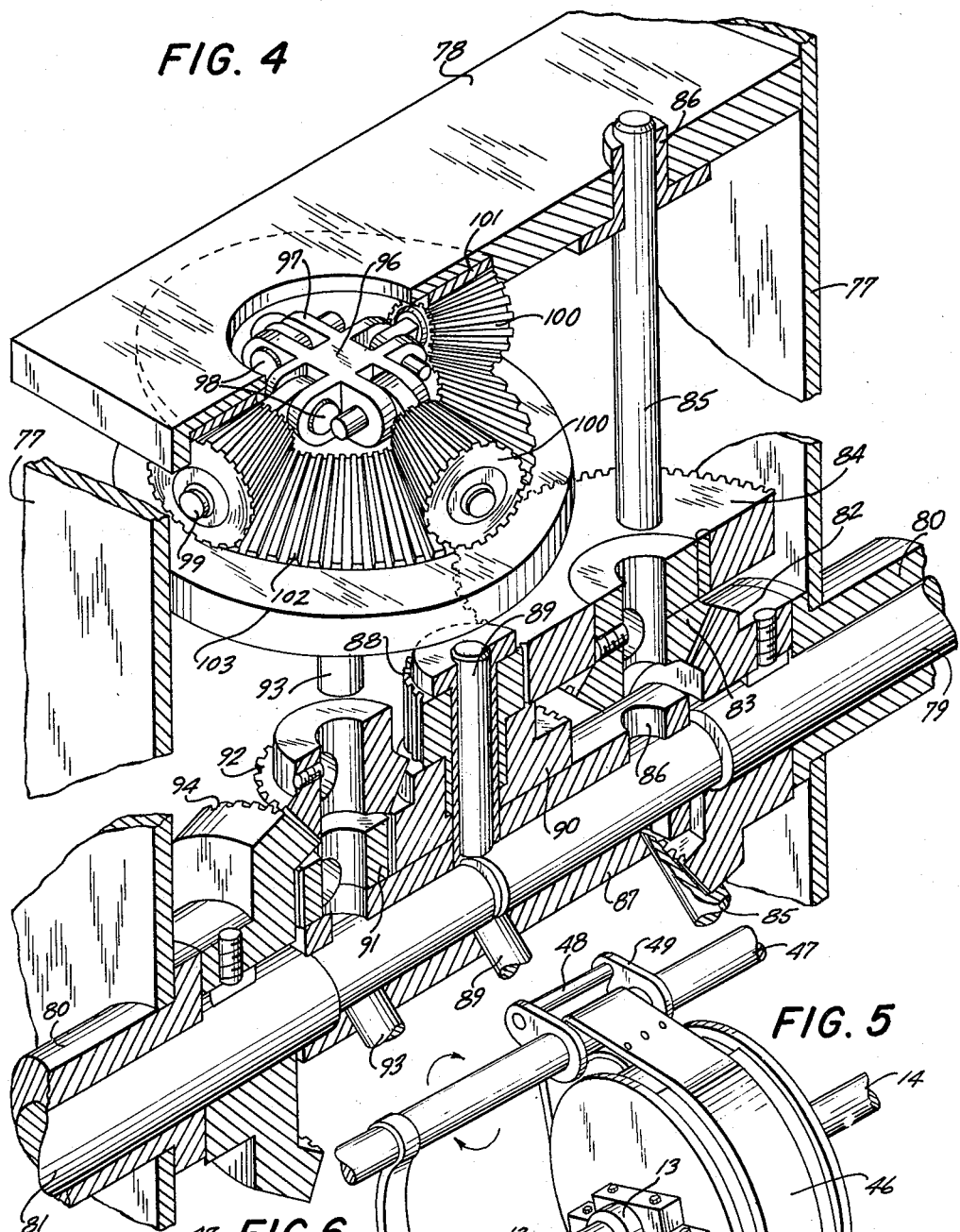
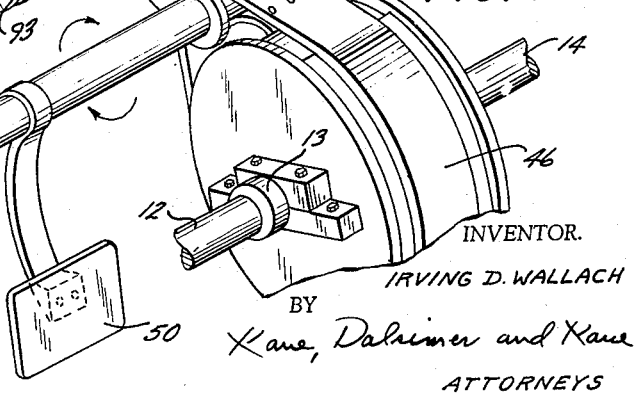
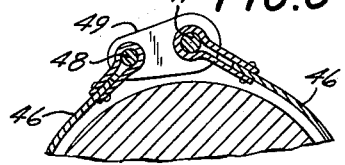
INVENTOR.
IRVING D. WALLACH
BY Kane, Dalsimer and Kane
ATTORNEYS _United States Patent Office_

2,959,071
Patented Nov. 8, 1960

2,959,071

TRANSMISSION

Irving D. Wallach, Cold Spring Harbor, N.Y., assignor to Conotorc Inc., Port Washington, N.Y., a corporation of New York Filed Dec. 10, 1958, Ser. No. 779,406

12 Claims. (Cl. 74—751)

This invention relates to a structurally and functionally improved transmission, capable of use in numerous different associations and of particular utility when applied to a motor-driven vehicle.

So applied, it will serve to efficiently transmit power to the driving wheels of the vehicle and to smoothly bring the latter up to a speed consistent with the speed of operation of the vehicle motor, and qualified only by the load imposed on the driving wheels. Moreover, when incorporated in a motor vehicle, movements of the latter in both forward and reverse directions may readily be effected and controlled by the transmission, aside from the fact that it is feasible to eliminate the differential unit from the motor vehicle, so that power to both driving wheels will be transmitted in equal amounts.

By resorting to the present teachings, an assembly is furnished which acts as a torsional vibration eliminator. In certain respects, transmission constructed in accordance with the present invention employ centrifugal forces in their functioning. However, the structure and operation are such that heat due to friction is almost eliminated. "Locked-in" speed of the transmission is achieved in a minimum time interval, without overloading or stalling the power source.

With these and other objects in mind, reference is had to the attached sheets of drawings illustrating practical embodiments of the invention and in which:

Fig. 4 is a perspective view of a further transmission including a connecting assembly of the type shown in Fig. 3;

Fig. 5 is a perspective view somewhat schematically illustrating a reversing expedient which may be resorted to in connection with the transmission;

Fig. 6 is a fragmentary sectional view of certain of the parts as illustrated in Fig. 5.

Figure 1:
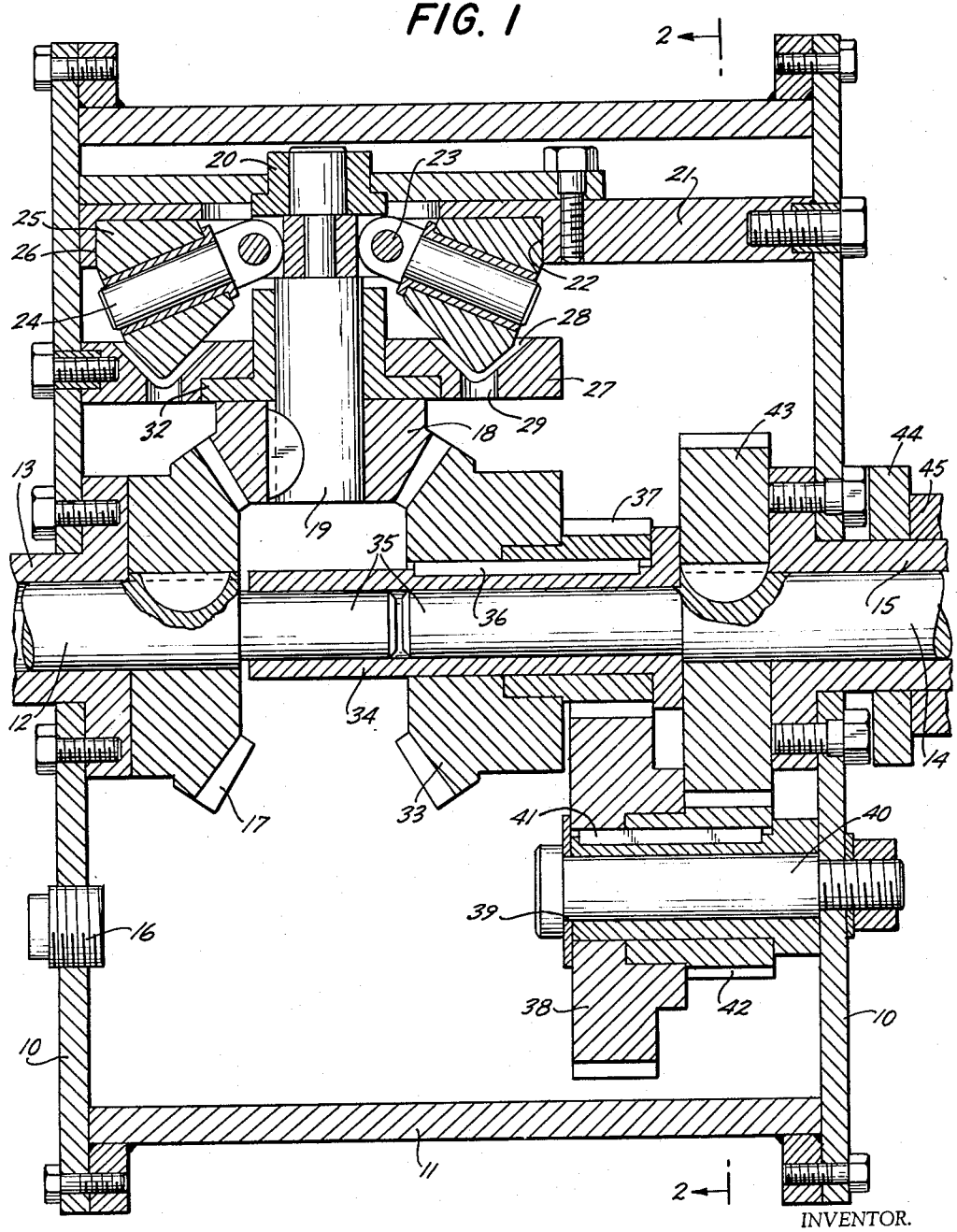
Fig. 1 is a sectional side view of a transmission constructed in accordance with the present teachings.
Figure 2:
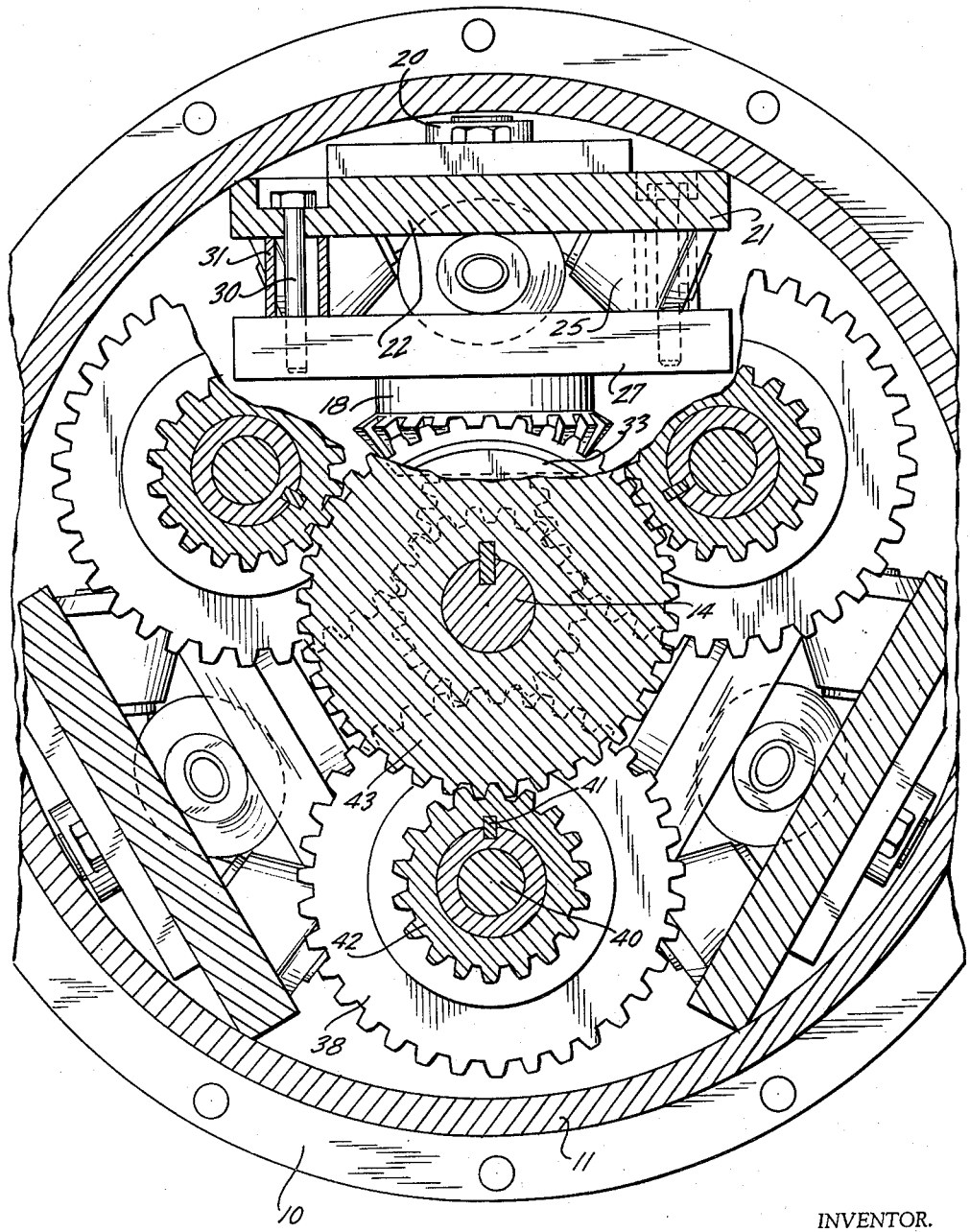
Fig. 2 is a transverse sectional view taken along the line 2—2 in the direction of the arrows as indicated in Fig. 1.

Referring primarily to Figs. 1 and 2, a transmission has been illustrated as including side plates 10 connected to each other by a preferably annular wall 11. The connection may be effected in any desirable manner and preferably assures against leakage of liquid from the interior of the casing. A driving shaft 12 is rotatably supported by a bearing 13 secured to one of the walls 10 and extends into the interior of the casing. A driven shaft 14 is likewise supported by a bearing 15 attached to the second wall of the casing and has its inner end extending into the interior of the casing. Conveniently, one of the side walls 10 mounts one or more plugs 16 which, upon removal, will permit the filling of the casing with oil to a suitable level, or else the draining of liquid from the casing interior.

Connected to the inner end of the driving shaft 12 is a bevel gear 17 the teeth of which mesh with those of three assemblies serving to connect the driving and driven shafts and to transmit power from the former to the latter. It is apparent that a greater or lesser number of these assemblies may be employed. Each such assembly will conveniently embrace a gear 18 having its teeth in mesh with the teeth of gear 17. Gear 18 is fixed against movement with respect to a radially extending shaft 19. At its outer end, each shaft 19 may be supported by a bearing 20. That bearing is mounted by a member 21 suitably secured against movement with respect to the casing parts of the transmission. Member 21 has its inner face recessed, as at 22, to provide an annular raceway surface.

Swingingly mounted upon pivot pins 23 disposed adjacent the upper end of each shaft 19 are wing shafts 24. Slidably and rotatably mounted upon each of these shafts are elements 25, preferably having a truncated cone outline and with base surfaces 26 extending at angles to the side surfaces in a manner such that the elements conform to the contour of the recessed portion 22. With a view to maintaining elements 25 in proper positions and preventing them from dropping away from the raceway defined by the surfaces of recess 22, a retainer plate 27 is employed. This plate is suitably secured against movement with respect to the casing of the transmission, and has in its outer face an annular groove 28 conforming to the zone of the side and base faces of the elements 25. The base of groove 28 is formed with a suitable number of perforations 29 through which liquid, such as oil, may flow. As illustrated especially in Fig. 2, bolts 30 may secure each plate 27 against movement with respect to member 21, and spacers 31 surrounding the bolts assure a proper separation of each member and retainer plate. So separated, and as illustrated especially in Fig. 1, it is apparent that elements 25 may rest within groove 28 and thus have their faces out of operative engagement with the surfaces of recess 22. Preferably, a suitable bearing 32 is interposed between shaft 19 and retainer plate 27. This bearing, together with bearing 20, will assure a proper support of this shaft and the coupling elements associated therewith. Also, it will serve to assure a proper position on the part of gear 18.

The teeth of gears 18 mesh with the teeth of a bevel gear 33. The latter is supported upon and fixed against rotation with respect to a sleeve 34. The inner end zones of shafts 12 and 14 are preferably reduced, as at 35, and disposed within the bore of this sleeve, which thus assures their constant alignment. In most transmission assemblies constructed in accordance with the present teachings, it is preferred that a reduction drive be interposed between gear 33 or its equivalent and driven shaft 14. That drive may have any value in accordance with the dictates of the designer and the requirements of an installation in which the transmission is incorporated.

A preferred form of reduction drive has been shown in Figs. 1 and 2. Again, from the latter figures it will be seen that three similar planetary assemblies are conveniently utilized, each spaced approximately 120° from the others around the axis of the transmission. Obviously, a different number of these assemblies might be employed.

As shown in Fig. 1, sleeve or tube 34, in addition to being secured to gear 33 by a key 36 or otherwise to prevent relative rotation, has similarly attached to it a gear 37. This latter gear is common to the several assemblies of cluster gears disposed around shaft 14. Each of those groups may include a gear 38 having its teeth in mesh with the teeth of gear 37. Gear 38, by means of a suitable bearing 39, is mounted upon a shaft 40 conveniently affixed to the adjacent side wall 10 of the transmission. The coupling between gear 38 and bearing 39 may be effected by a key 41, which also secures against relative rotation with respect to these parts a pinion 42. The teeth of the latter mesh with the teeth of a gear 43. That gear is secured against rotation to shaft 14.

The adjacent flange of bearing 15 serves to maintain proper spacing between the inner face of the side wall 10 and gear 43. It is conveniently secured against movement with respect to that side wall by means of bolts. Spacers 44 are preferably interposed between the heads of these bolts and a box bearing, which has been partially shown in Fig. 1 and identified by the numeral 45. It is thus apparent that when gear 33 turns, through the gear train 37, 38, 42 and 43, it will serve to drive shaft 14. The reduction train thus provided may conveniently result in a 90° rotation on the part of shaft 14 to each 360° rotation on the part of gear 33. Obviously, a higher or lower ratio might be resorted to.

Now, considering the operation of the mechanism as shown primarily in Figs. 1 and 2, it will be assumed that shaft 12 is connected to a suitable source of motive power and is rotating. Shaft 14 is connected to mechanism to be driven, and is stationary. With shaft 12 rotating at a relatively slow speed, and the resistance to movement on the part of shaft 14 being substantial, gear 17 will rotate, to thus cause rotation and orbital movement on the part of each of the gears 18, which will simply traverse the teeth of stationary gear 33. Under these circumstances, shafts 19 will each rotate to turn wing shafts 24 around the axis of the shaft 19. The cone elements 25, when in an upward position, will simply bear against the surfaces of the groove 28 in an adjacent retainer plate 27. As they reach positions below the axis of shaft 12, they will bear lightly against the surfaces of the raceway 22. It follows that the parts will thus rotate, and no effective driving force will be transmitted through gear 33 to shaft 14.

As the speed of rotation of shaft 12 is increased, that of the cones 25 or equivalent elements around the axes of their supporting shafts 19 will also increase. Simultaneously, the orbital movements of the cone assemblies around the axes of shafts 12 and 14 will be accelerated. Two sets of centrifugal forces are thus created. This results in forcing the side faces of elements 25 and their base portions 26 into increasingly intimate contact with the surfaces of raceways 22; it being noted that elements 25 are both slidable and rotatable with respect to their wing shafts 24.

Continued increase of the r.p.m. of shaft 12 and the drum-shaped casing assembly will so increase the centrifugal forces that the cone elements will begin to grip the surfaces of raceways 22 and thus brake the rotation of bevel gears 18. This retarding of the rotation of these gears will initiate rotation on the part of gear 33. Therefore, through the planetary reduction gearing provided by clusters 38–42, gear 43 will begin to rotate, to thus drive shaft 14. As the speed of shaft 12 increases, and depending upon the load on the driven shaft, gears 18 will eventually cease rotating, thus providing a direct connection between gears 17 and 33. Therefore, when this occurs the entire assembly functions as a solid unit from the driving through to the driven shaft. As will be understood, under these circumstances, and with the casing rotating at substantial speed, the greatest effective centrifugal force obtains.

At any speed less than that necessary to lock the cone elements with respect to their raceways, the unit is in an intermediate gear stage. As is apparent, the locking of the several parts of the assembly against rotation with respect to each other may be varied in a number of different ways, as, for example, by employing a larger or smaller grouping of cones in each connecting assembly and varying the size of these elements. Also, the number of the connecting assemblies may be varied, as may also the distance of these assemblies from the axis defined by shafts 12 and 14. Additionally, the distance of these cone elements from the axes of shafts 19 will affect the drive results, as will the ratio of gear 17 to the pinions 18. It will also be apparent that the magnitude of reduction between the driven gear 33 through the planetary gears to the driven shaft 14 will vary with the results.

For overcoming starting inertia of very heavy loads, where the ratio of horsepower to, for example, the vehicle weight, is low, the planetary reduction must be high. In any event, for any power source and for its maximum load requirements, it is apparent that there must be an optimum choice of all the design characteristics outlined. It is obvious that with proper design, any conceivable reduction may be incorporated in the unit. In all instances, with the unit as illustrated in Figs. 1 and 2, and with the speed of rotation of shaft 12 increasing, the connecting assemblies as provided by the cone elements 25 will bear with such intimacy against the surfaces of the raceway assemblies that with normal load conditions, a "locking in" of the parts occurs, as aforedescribed.

The desired retardation of the cones is assisted by the use of the body of lubricating oil within the drum. The level of this liquid should ordinarily not exceed one-half the depth of the drum. The openings 29 in the retainer plates 27 allow free oil circulation. It is apparent that as the casing rotates, the oil or other liquid will seek to fly outwardly to the rim of the drum, thus forming an oil torus under the action of centrifugal force. The body of oil will fill the spaces not occupied by the elements of the coupling assemblies. However, the rolling of the cones will tend to pump oil out of the raceway spaces. Since the drum is rotating, the several forces involved will act to urge the liquid back into the spaces defined by the raceways. Accordingly, a retarding action is imparted to the connecting elements as defined by the cones, because the oil impedes their motion in the raceways.

It is definitely preferred to have the casing of drum shape. As shown in Figs. 5 and 6, by encircling the drum with, for example, a suitable band 46 which is constrictable therearound, the rotation of the drum may be braked. With the drum held stationary, the transmission unit will serve to drive shaft 14 in a reverse direction. As shown, one end of band 46 may be suitably attached to a shaft 47. That shaft will carry a crank 48 by, for example, arms 49. With the second end of band 46 secured to crank 48 and a pedal 50 or other actuating member connected to shaft 47, that shaft may be oscillated. In one extreme position, band 46 will be intimately constricted around the drum to thus hold the latter against rotation. In the opposite extreme position of the shaft, the casing will be free to rotate.

It is apparent that when the casing is held against rotation, shafts 19 will have no orbital rotation. Therefore, driving force on gear 17 will cause pinions 18 to force gear 33 to rotate in a direction opposite to that of the rotation of shaft 12. Accordingly, driven shaft 14 will be forced to rotate in a reverse direction. During this operation of the parts the reduction train provided by gears 37, 38, 42 and 43 will, of course, function so that no difficulty will be experienced in overcoming the load factor imposed upon shaft 14. Under these circumstances, the body of liquid will not be forced into toroidal shape around the driving elements. This, however, is of no consequence, in that the transmission operation will not be in any way dependent upon the cooperation of the oil body to effect reverse drive.

Arresting rotation of the casing by brake band 46 or otherwise also permits the transmission to function as a brake. This is particularly noticeable when the unit is applied to a motor-driven vehicle, in that with the transmission effecting a forward drive, the pedal 50 may be actuated. However, the rotational speed of shaft 12 is not substantially diminished. It has been found that under these circumstances the driving wheels, even with forward movement of the vehicle, turn in a reverse direction, resulting in an emergency stop. Thus, the actual power of the engine coupled to shaft 12 may be used to stop the vehicle, instead of depending merely upon engine drag to decelerate it. Additionally, if it becomes necessary to "rock" the car, this may readily be done by opening the throttle of the engine to a wide extent and alternately pressing and releasing the reverse pedal 50. Under these circumstances, the car will move ahead and jump backward as rapidly as the operator releases and increases the pressure on the pedal 50. Of course, the transmission will ordinarily not be depended upon for its braking function. A vehicle employing the transmission will usually have three controls, involving an accelerator pedal, a brake pedal connected to an ordinary braking system, and a reverse pedal.

It has also been found that with the unit of this character, a transmission is provided which functions as a torsional vibration eliminator. More particularly, vibratory torques impressed on either side of the unit will be immediately arrested within the same. This is because the cone or connecting assembly elements will move instantly in the event of any substantial torque excess. Therefore, the unit serves momentarily as a loose coupling between the driving and driven shafts. This will be apparent because any movement on the part of the cone assemblies immediately breaks the solid connection or coupling between the driving and driven shafts.

Figure 7:
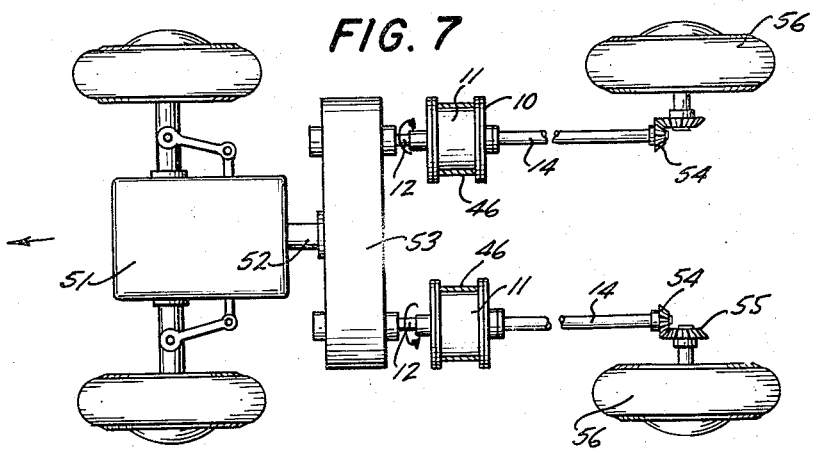
Fig. 7 is a somewhat schematic view of a power-driven vehicle, showing transmissions disposed in driving relationship with that vehicle.

A preferred application of the transmission to a motor vehicle has been somewhat diagrammatically illustrated in Fig. 7, in which the numeral 51 indicates the engine having a drive shaft 52. The latter extends into a casing 53 containing gears (not shown). These gears serve to impart rotation to shafts 12 of two different transmission units. The driven shafts 14 of these units carry, for example, gears 54, which mesh with the teeth of gears 55 secured to shafts mounting wheels 56.

While it is of course feasible to employ a single transmission, it is to be noted that with the utilization of two units, as illustrated in Fig. 7, differential movement of the driving wheels when the vehicle is following a circular path is achieved. Therefore, it is unnecessary to provide a differential assembly as commonly utilized in vehicles. An additional advantage is that power is always available at both driving wheels in equal amounts. Therefore, even if one of the wheels 56 slips, no difficulties are experienced, in that the vehicle will move in a desired direction regardless of the slip of that one wheel.

Ordinarily, transmissions embodying the present teachings will in every instance include a train of reduction gearing. In special installations, however, it may be feasible to eliminate this reduction train. This has been generally illustrated in Fig. 3. However, this view is far more important in that it shows a connecting assembly of a design alternative to that of Figs. 1 and 2, and which in certain respects it is preferred to employ in a conventional transmission installation. So employed, it will ordinarily embrace an assembly including a reduction train as shown in Figs. 1 and 2, or else of the type shown in Fig. 4.

Figure 3:
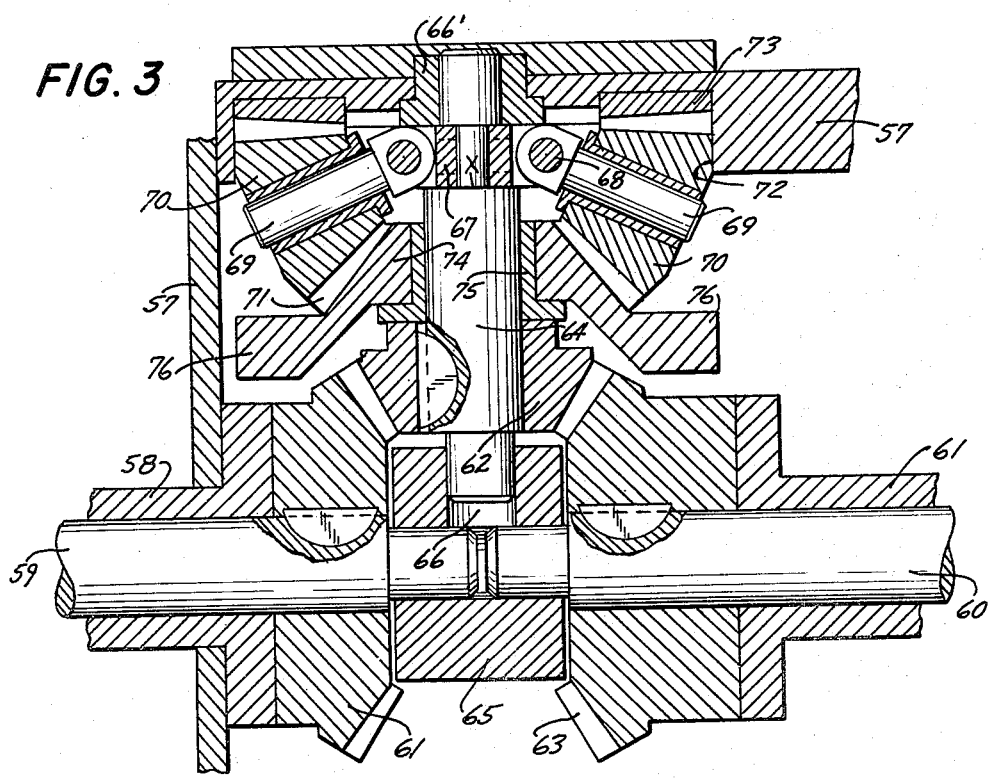
Fig. 3 is a fragmentary sectional side view of a transmission embodying an alternative design.

Thus, in Fig. 3 the numeral 57 identifies the rotatable casing including, for example, parts of the type heretofore identified under the numerals 10 and 11. Extending through a suitable bearing 58 projecting from one side face of the casing is a drive shaft 59. Extending in line with the latter is a driven shaft 60 encircled by a suitable bearing 61'. If desired, the casing part may terminate substantially in line with the inner end of that bearing. In such case, a reduction train of gearing will not form a part of the transmission. Having in mind that such gearing usually is necessary, the casing will be extended beyond the point specified, and shaft 60 will be a driven shaft merely in the sense that it connects to a train of reduction gearing (not shown) which is in turn suitably coupled to an ultimate driven shaft.

A bevel gear 61 is suitably secured against rotation with respect to shaft 59 and has its teeth meshing with the teeth of pinion 62. In turn meshing with the teeth of the latter is a second bevel gear 63 secured against movement with respect to shaft 60. In this form of transmission also it is preferred that three connecting assemblies be provided spaced 120° apart around the axis of shafts 59 and 60. Each of these assemblies will include a pinion shaft 64 secured against rotation with respect to pinion 62. A spider bearing 65 is conveniently employed to maintain the parts in proper position. To this end, it is formed with a transverse bore receiving the reduced ends of shafts 59 and 60. Also, it is formed with three radial bores 66 to receive the similarly reduced ends of pinion shafts 64. The outer ends of these shafts are supported by thrust bearings 66' conveniently carried by parts of the casing assembly 57.

Adjacent its outer end each of shafts 64 conveniently mounts a fitting 67 which supports the pivots 68 of wing shafts 69. The latter slidably and rotatably support cone elements 70. These cones, unlike the parts as heretofore traversed, are formed with annular series of serrations or teeth 71 in their side faces. The adjacent outer element of the casing assembly is formed with a recess having an annular edge surface 72 for cooperation with the base surfaces of the elements 70. The recess is sufficiently large so that it may receive and retain, by, for example, a press fit, a bevel gear 73. The teeth of each such gear form a complete annulus and are in mesh with the teeth 71 of the elements 70.

Forming a part of each of the assemblies of connecting elements is bevel gear 74. This is supported upon bushing 75, which is slidably and rotatably encircled by the pinion shaft 64. Conveniently, the lower end of the bushing 75 is flanged outwardly to provide a member bearing against the pinion 62 in order to maintain the parts in proper positions with respect to each other. So disposed, the teeth of pinion 74 will constantly but somewhat loosely mesh with the teeth 71 of a group of cone elements 70. The teeth of the latter (with the parts static) will similarly mesh with the teeth of bevel gear 73. This will be true except when a connecting assembly is in an upwardly or downwardly extending position. Under such circumstances, the teeth 71 will somewhat loosely mesh with the teeth of an upper gear. Secured to or integral with each of pinions 74 is a loading weight 76 in the form of an annular disk which moves with that pinion. This disk is in effect a miniature flywheel. All axes and tooth elements of the assembly as shown in Fig. 3 coincide at a common point, such as X, to assure a proper and efficient cooperation of the parts.

Assuming that driven gear 63 is loaded (i.e., resistant to turning) and stationary, and with driving gear 61 rotating, pinion 62 will rotate, thus causing cone elements 70 to roll in raceway 72. A positive interengagement of the parts occurs, due to the intermeshing of the teeth of bevel gear 73 with the teeth 71 of the elements 70. Coincidental with the rolling of these elements will be a rotation of each pinion gear 74 and rotation of casing 57. Therefore, the entire assembly will have orbital movement around the common axis of shafts 59 and 60. With increasing speed of rotation of bevel gear 61, orbital movement of each of the connecting assemblies will impart increasingly greater centrifugal force to the cones 70 and loading gear 74. In the case of the cones this force will act radially of axis 59—60 and also substantially radially of shaft 64. Accordingly, there will be established a high degree of intimacy of contact between each group of elements 70 and the bevel gear 73 of that group. As the speed of rotation of shaft 59 is increased, the cone elements will, because of these forces, be retarded in their movements in the circular path around gear 73. Accordingly, gear 63 will be forced into rotation, to function as previously described in connection with the structures illustrated in Figs. 1 and 2. However, the loading gear or pinion 74 will accelerate the retardation of cone elements 70. It is obvious that the clearances between all teeth embraced in a connecting assembly will be provided for so that there will be no possibility of a wedging or jamming action occurring. Under initial conditions, all movements of the several components are relatively free with respect to each other.

It is apparent that a transmission in accordance with the teachings exemplified in Fig. 3 provides a structure such that positive interengagement between the units occurs. This interengagement—insofar as ultimate drive is concerned—is assured by the definite mechanical coupling of the parts, resulting from constant intermeshing of the teeth of the bevel and pinion gears included in each connecting assembly. It is also obvious that such an assembly may be associated with a brake similar to that heretofore described in connection with Figs. 5, 6 and 7, and that a pair of transmissions may be included in the drive of a motor vehicle, as illustrated in Fig. 7. The same advantageous results attributable to a constant intermeshing of the teeth in a forward drive will follow in the functioning of a reverse drive. The flywheel provided by the loading weight 76 will in each instance assure efficient cooperation between the parts.

The same principle of operation as that governing the functioning of the structure of Fig. 3 is present in the assembly shown in Fig. 4. That assembly, however, includes one form of gear train providing a suitable reduction. As will be noted in Fig. 4, the casing assembly conveniently includes side walls 77, between which members 78 extend to provide or support raceways. A driving shaft 79 is rotatably disposed with respect to a bearing 80 carried by one of the walls 77. A similar bearing rotatably mounts a driven shaft 81, which is axially aligned with shaft 79 and enters the casing through the opposed side wall thereof. Secured to rotate with driving shaft 79 is a bevel gear 82. The teeth of this gear mesh with the teeth of gears forming parts of different assemblies. Each of these includes a pinion gear 83 which is secured against movement with respect to a gear 84. Both of these gears are supported upon a shaft 85, which has a suitable bearing adjacent its outer end and preferably extends into a socket or opening 86 formed in a sleeve bearing 87 at its inner end. The teeth of gear 84 mesh with the teeth of a sprocket 88. The latter is fixed against rotation with respect to a gear 90, and both of these gears are rotatably supported on a shaft 89. The teeth of gear 90 mesh with the teeth of sprocket 91, which is fixedly secured against movement with respect to a pinion 92 mounted by a shaft 93. The teeth of the latter pinion mesh with the teeth of a bevel gear 94 which is secured to driven shaft 81.

Again, any desired number of connecting assemblies may be provided. For example, three may be used. The same is true of the clusters of gears 89—92 and 83—84. Shaft 93 will be ensleeved within the bores of gears 91—92 and secured against movement with respect to the same. At their outer ends, the radially extending shafts 93 each, as shown mount a fitting 96 for the support of wing shafts. Also at these points, bearings may be furnished for the shafts 93.

Fittings 96 will conveniently include pairs of spaced ears 97, between which pivot pins 98 extend. Conveniently, as shown, the end of one pin may overlap the head of an adjacent pin, so that by simply employing a suitable extraneous securing element, one is assured that all pins will remain in proper positions. The inner ends of wing shafts 99 extend one between the ears of each pair 97 and encircle pins 98. These wing shafts slidably and rotatably support cone elements 100. The latter, as in the structure of Fig. 3, are formed with teeth in their side faces. These teeth mesh with an annulus of teeth 102 forming a part of a loading weight 103, or else included in a suitable bevel gear body which is attached to that flywheel. The teeth of elements 100 also mesh with the teeth of a bevel gear 101 conveniently having a press fit within a recessed surface of the cross member 78. It is apparent that this recess is of such area that the base portions of the cone elements bear against the annular side face thereof.

With a load on driven shaft 81 and driving shaft 79 rotating at slow speeds, the gear train beginning with bevel gear 82 and ending with pinions 92 will be rotated. Shaft 81 being stationary and bevel gear 94 likewise being stationary, it follows that the entire transmission assembly will have orbital movement around the axes of shafts 79 and 81. The speed with which the parts are driven under "idling" conditions will not result in the creation of sufficiently strong centrifugal forces to effect any drive of shaft 81. However, as the speed of the driving shaft is increased and the cone elements 100 continue to rotate within the raceways, elements 100 will have their base portions bear with increasing intimacy against the circular edge surface of the raceway. Increasing speed of rotation will also cause the slidably mounted gear and flywheel structure 102–103 to tend to shift outwardly. This will establish an intimate bearing between the teeth of elements 100 and the teeth of bevel gear 101, in addition to the aforenoted engagement between the base portions of these elements and the edge face of the raceway. Under these circumstances, the cone elements will be retarded in their movements in the circular path around gear 101 and will slow down. As this occurs, pinions 92, in engagement with bevel gear 94, will initiate rotation of the latter and therefore of the driven shaft. Under normal conditions, this cooperation of the parts will progressively increase, until in effect shafts 79 and 81 move in synchronism. As in the structure shown in Fig. 3, clearances between all teeth in the connecting elements are chosen so that there will be no possibility of a wedging or jamming action occurring. The several factors, as heretofore described in connection with the operation of the transmission and its application, for example, to a motor vehicle, will also apply with regard to the transmission as illustrated in Fig. 4.

Thus, among others, the several objects of the invention as specifically aforenoted are achieved. Obviously, numerous changes in construction and rearrangements of the parts may be resorted to without departing from the spirit of the invention as defined by the claims.

I claim:

1. In a power transmission having rotatable driving and driven shafts extending into a rotatable supporting structure, with a rotatable further shaft extending radially outwardly from and operatively connected to the first-named shaft to be rotated thereby, a control assembly comprising a wing shaft swingingly connected to the outer end of said further shaft, a raceway in line with that further shaft and extending substantially transversely to its axis, said raceway being secured to said supporting structure, an element rotatably mounted by said wing shaft to swing outwardly with the latter away from the axis of the further shaft under the action of centrifugal force to follow an orbital path around said driving and driven shafts as well as said further shaft and to rotatably bear against the surface of said raceway facing in the direction of said driving and driven shafts, means operatively connecting said further shaft with said driven shaft and means for frictionally contacting said conical element in said raceway and providing braking for said conical element for assuring a non-slipping engagement between the surface of said raceway and the surface of the element engaging the latter.

2. In a transmission as defined in claim 1, said last-named means comprising cooperative gear teeth forming a part of said raceway and conical element.

3. In a transmission as defined in claim 2, the swinging connection between said further shaft and wing shaft comprising a clevis and pivot pin coupled thereto.

4. In a transmission as defined in claim 2, a further member encircling said further shaft and disposed inwardly of said element to furnish a support therefor.

5. In a transmission as defined in claim 2, said element heavy teeth forming a part thereof being disposed in its side face.

6. In a transmission as defined in claim 2, said means to operatively connect said further shaft and driven shaft comprising a train of cooperating gears furnishing a definite ratio of drive and interposed between said first-named shaft and said further shaft.

7. In a transmission as defined in claim 1, said shiftable means comprising a plate encircling said further shaft and interposed between said first-named shaft and conical element.

8. In a transmission as defined in claim 7, said raceway, element and plate being formed with teeth engaging with each other.

9. In a transmission as defined in claim 8, means preventing a shifting of said plate axially of said further shaft to a point at which said teeth are clear of engagement with each other.

10. In a power transmission having rotatable driving and driven shafts extending into a rotatable supporting structure, with a rotatable further shaft extending radially outwardly from and operatively connected to the first-named shaft to be rotated thereby and means for operatively coupling said further and driven shafts, a control assembly comprising a raceway in line with that further shaft and extending substantially transversely to its axis at a point adjacent the outer end of said further shaft, said raceway being secured to said supporting structure, a cone-shaped element rotatable around said raceway and connected to be driven by said further shaft upon rotation of the latter to shift outwardly and bear against a raceway surface with its base under the action of centrifugal force, and cooperative gear teeth forming parts of said raceway and element to assure positive engagement between the same.

11. In a power transmission as defined in claim 10, a bevel gear encircling said further shaft and said element being interposed between said bevel gear and said raceway.

12. In a power transmission as defined in claim 11, said bevel gear being slidable axially of said further shaft and embracing a mass such that with the rotation of said supporting structure, centrifugal force will cause the teeth of said bevel gear to intimately engage the element and press the same into contact with said raceway.

References Cited in the file of this patent

UNITED STATES PATENTS

| 785,182 | Perry | Mar. 12, 1905 |
| 1,409,864 | Jones | Mar. 14, 1922 |
| 1,589,928 | Bee | June 22, 1926 |
| 2,020,739 | Porter | Nov. 12, 1935 |
| 2,695,534 | Renart | Nov. 30, 1954 |
| 2,874,591 | Thoma | Feb. 24, 1959 |
| 2,876,657 | Allin et al. | Mar. 10, 1959 |

FOREIGN PATENTS

| 328,027 | Great Britain | Apr. 15, 1930 |